United States Patent
Sewell

Patent Number: 5,408,541
Date of Patent: Apr. 18, 1995

[54] METHOD AND SYSTEM FOR RECOGNIZING TARGETS AT LONG RANGES

[75] Inventor: Kenneth G. Sewell, Dallas, Tex.

[73] Assignee: Lockheed Corporation, Fort Worth, Tex.

[21] Appl. No.: 601

[22] Filed: Jan. 5, 1993

[51] Int. Cl.6 .............................................. G06K 9/20
[52] U.S. Cl. ......................................... 382/48; 356/3; 382/1; 348/144
[58] Field of Search ...................... 382/1, 48; 356/3, 7, 356/12, 4; 248/143, 144, 148

[56] References Cited

U.S. PATENT DOCUMENTS

| | | | |
|---|---|---|---|
| 4,866,781 | 4/1989 | Borken et al. | 382/1 |
| 4,901,362 | 2/1990 | Kerzuin | 382/1 |
| 4,903,309 | 2/1990 | Wentworth et al. | 382/1 |
| 4,905,292 | 2/1990 | Wentworth et al. | 382/1 |
| 4,969,735 | 11/1990 | Gilligan | 356/4 |
| 5,109,435 | 4/1992 | Lo et al. | 382/48 |
| 5,168,530 | 12/1992 | Perogoin et al. | 382/48 |

*Primary Examiner*—Joseph Mancuso
*Attorney, Agent, or Firm*—Baker & Botts

[57] ABSTRACT

An improved method and system (30) for recognizing targets (16) at long-ranges permits target recognition at or near the ranges at which the targets are initially detected. The method includes the steps of detecting (32) the target (16) relative to a sensor platform (12), and, in response to the detection, determining a set of range parameters (40) from the sensor platform (12) to the target (16). After transferring the set of range parameters to a gated television sensor (44) that serves as an imaging device, the method next involves illuminating the target area associated with the range parameters with a laser pulse (42) to generate reflected energy (48) from the target (16). The reflected energy (48) is then highly magnified and imaged (46) using the gated television sensor (44). The image (46) may be sent to an automatic target recognizor system (70) or displayed for operator recognition (72).

19 Claims, 3 Drawing Sheets

METHOD AND SYSTEM FOR RECOGNIZING TARGETS AT LONG RANGES

TECHNICAL FIELD OF THE INVENTION

This invention relates in general to the field of fire control and target acquisition and, more particularly, to an improved method and system for recognizing targets at ranges near or equal to ranges at which they are initially detected.

BACKGROUND OF THE INVENTION

In a battlefield scenario, the lethality and survivability of an aircraft or ground vehicle often critically depends on the effectiveness of the target acquisition and fire control technology that the vehicle employs. An important aspect of any target acquisition and fire control system is the ability see or image a target. In target acquisition and fire control technology, four stages of target imaging quality are important: (1) detection, (2) classification, (3) recognition, and (4) identification. Detection is defined as the ability to discern a signal that may be a target. Classification is defined as the ability to discern that the target is, for example, a tracked or a wheeled vehicle. Recognition is defined as the ability to determine the type of vehicle, such as a tank or an armored personnel carrier. Identification is defined as the ability to determine the type of tank, e.g., a Soviet T-72 tank versus a U.S. M-1 tank.

In a typical imaging sensor system, target classification requires about three times as many lines across the target as is required for detection. Recognition generally requires four times as many lines across the target, and identification requires eight times as many lines as is required for detection. Tactical targets emit infrared radiation that a thermal imaging sensor (TIS) receives to detect the target. Generally, a TIS can detect a target with two or fewer lines across the target. This means that, under "normal" conditions (i.e., mid-latitude summer day with 5-kilometer visibility), detection by a TIS will occur at 8 kilometers, whereas recognition ranges are significantly less (i.e., approximately 3.8 kilometers). An aircraft or tank commander cannot release a weapon until he recognizes the target. Once a pilot has recognized a target, a finite amount of time is required to actually release a weapon. Therefore, weapon release usually will be at ranges less than 3.8 kilometers. Hence, the farther away an aircraft pilot or tank commander, for example, can recognize a target, the greater will be the aircraft's or tank's success in attacking and surviving an attack from an enemy vehicle having equally effective weapons.

In an air-to-ground combat scenario, the large difference in detection and recognition ranges that conventional target recognition systems demand requires a pilot to maintain line-of-sight contact with the target while his aircraft moves into closer range. This causes the aircraft to enter a more dangerous zone and to remain exposed for a longer time period. This reduces the probability that the aircraft can survive the attack. Also, a reduced recognition range lowers the weapon release range and, thereby, restricts the number of weapons that a pilot can release to different targets on the same pass.

Techniques heretofore known to increase TIS recognition ranges supply additional magnification. These systems, however, are too heavy and expensive to be practical for tactical aircraft. A second approach to target detection and recognition has been the use of television systems. Because television systems require illumination for adequate imaging, however, they have substantial operational limitations. Conventional television systems use lasers as the illuminating source for imaging. When a television-laser system is used in a search and detect mode, obtaining a reasonable probability of finding a target requires a fairly wide field-of-view. Illuminating the necessary field-of-view for such applications (typically 4 to 30 degrees), however, requires extremely high power laser sources. These laser sources are so large that they, also, are impractical for use on tactical aircraft.

Therefore, a need has arisen for a system that is compatible with tactical aircraft that increases a target's recognition range to near or equal the target detection range.

There is a need for a method and system that provides longer range target recognition, and that clearly avoids the weight, expense, size, and large illumination field-of-view problems of known systems that seek to increase target recognition ranges.

SUMMARY OF THE INVENTION

Accordingly, the present invention provides a method and system that permit recognizing targets at ranges near or equal to ranges at which the targets are initially detected and that substantially eliminate or reduce disadvantages and problems associated with prior target recognition systems.

According to one aspect of the present invention, a method is provided for increasing the recognition range of an target by first detecting the target relative to a sensor platform and, in response to the detection, determining a set of range parameters, such as target coordinates, from the sensor platform to the target. The method then is to transfer the set of range parameters to an imaging device to cue the system of the present invention to the angular location of the target. The next step involves illuminating the area associated with the range parameters by a laser pulse to generate reflected energy from the target. The reflected energy from the illuminated target is then highly magnified and imaged with a gated television sensor. The method's next step is to recognize the image by either using an automatic target recognition system or displaying the image for operator recognition, or both. The preferred embodiment may use an infrared imaging device or radar for initial target detection.

A technical advantage of one embodiment of the inventive concept is the use of one sensor, such as a thermal imaging sensor to perform the search and detect functions and a laser illuminator and gated imaging sensor to perform the recognition functions. This allows using a small field-of-view high-magnification optical device to perform the imaging functions for target recognition.

Another technical advantage of the present invention is that the small field-of-view of the high-magnification restricts the necessary angle for laser illumination. This reduces the laser power required for tactical ranges to practical levels. Because the present invention has lower power requirements for laser illumination than those of conventional devices, using physically smaller power supplies is practical with the present invention. The entire system of the present invention, therefore, may be packaged in a small, compact, and relatively inexpensive system.

Yet another technical advantage of the present invention is that the increased recognition range that the system of the present invention provides allows a tactical fighter to not only release ordinance against targets at safer ranges, but also to increase the number of ordnance releases per target pass. The invention, thereby, increases the survivability and lethality of a tactical platform.

A further technical advantage of the present invention is its flexibility in various warfare. The present invention provides several other desirable functions. These include the following:

(1) passive television imaging without laser illumination when light levels are sufficiently high;

(2) image fusion between the search and detect thermal imaging sensor and the imaging television sensor;

(3) laser designation when using a Nd:YAG laser for search, detect, or imaging;

(4) obstacle detection and avoidance by illuminating and imaging the terrain in front of a low-flying aircraft;

(5) detection of optical and electro-optical threats through retro-reflection of laser energy;

(6) blinding, dazzling, or destruction of eyes, and optical and electro-optical sensors with laser radiation;

(7) long-range recognition of airborne targets;

(8) accurate determination of target coordinates relative to the platform; and (9) independent target tracking.

Another technical advantage is the wide variety of sensor platforms that may use the present invention. The method and system of the present invention is not limited to air to ground applications, but may also be adapted for air-to-air, ground-to-ground, and other battlefield scenarios.

BRIEF DESCRIPTION OF THE DRAWINGS

For a more complete understanding of the present invention and for further advantages thereof, reference is now made to the following brief description of the preferred embodiment taken in conjunction with the accompanying FIGUREs, in which.

DETAILED DESCRIPTION OF THE PREFERRED EMBODIMENT

The preferred embodiment of the present invention is best understood by referring to the FIGUREs wherein like numerals are used for like and corresponding parts of the various drawings.

Figure 1:
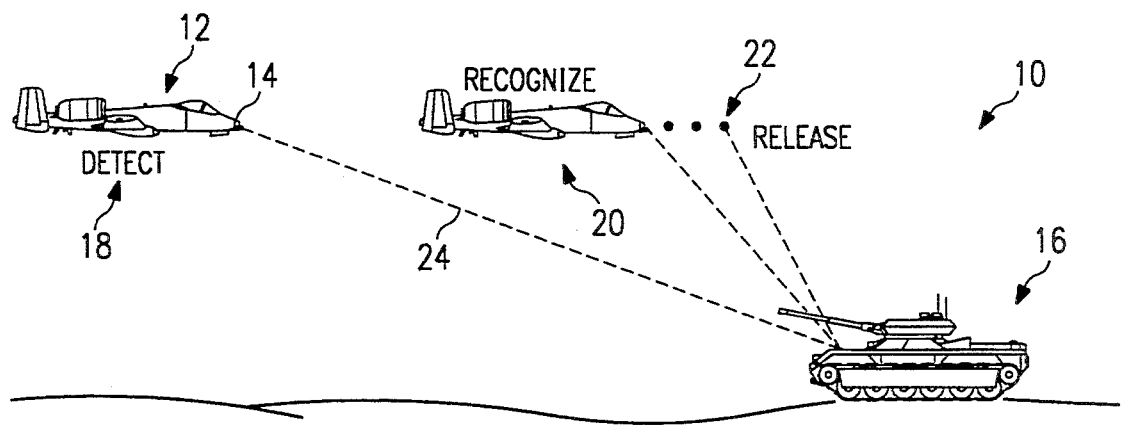
FIG. 1 illustrates a possible operational scenario depicting the different conventional ranges between a sensor platform and a target for detection, recognition, and weapon release to illustrate the problem that the preferred embodiment solves.

FIG. 1 shows an operational scenario 10 to illustrate the problem that the preferred embodiment solves. Tactical fighter 12 uses a sensor 14, such as a radar system or thermal imaging sensor (TIS) to detect target 16 at a range of approximately 8 kilometers, as indicated by reference numeral 18. This exemplary detection range assumes "normal conditions," i.e., mid-latitude summer day with a 5-kilometer visibility. Due to limitations of conventional sensors, target recognition cannot occur until tactical fighter 12 is within 3.8 kilometers of target 16 as reference numeral 20 indicates. A finite amount of time is required for the pilot of tactical fighter 12 to release a weapon upon recognition. Therefore, actual weapon release does not occur until the 3.2 kilometer point of reference numeral 22. During the period of time between detection at 8 kilometers and recognition at 3.8 kilometers, the pilot must maintain this line of sight 24 with target 16 in order for recognition to occur. This time period increases the tactical fighter's vulnerability as well as limits the number of weapons the pilot may release on a given pass through a scenario 10.

Figure 2:
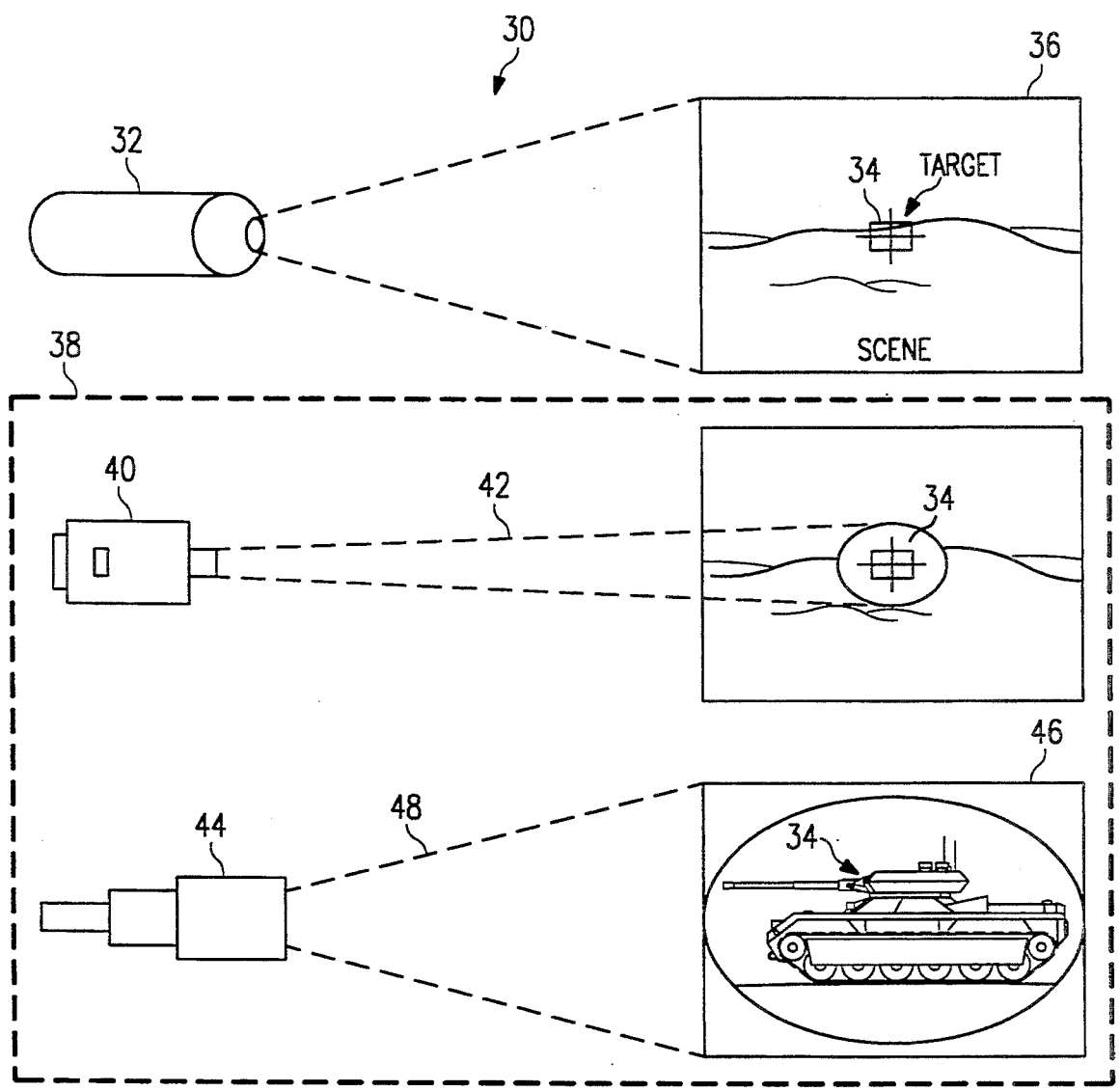
FIG. 2 provides a simplified conceptual illustration of the laser-aided target acquisition and recognition sensor (LATARS) system of the preferred embodiment.
Figure 3:
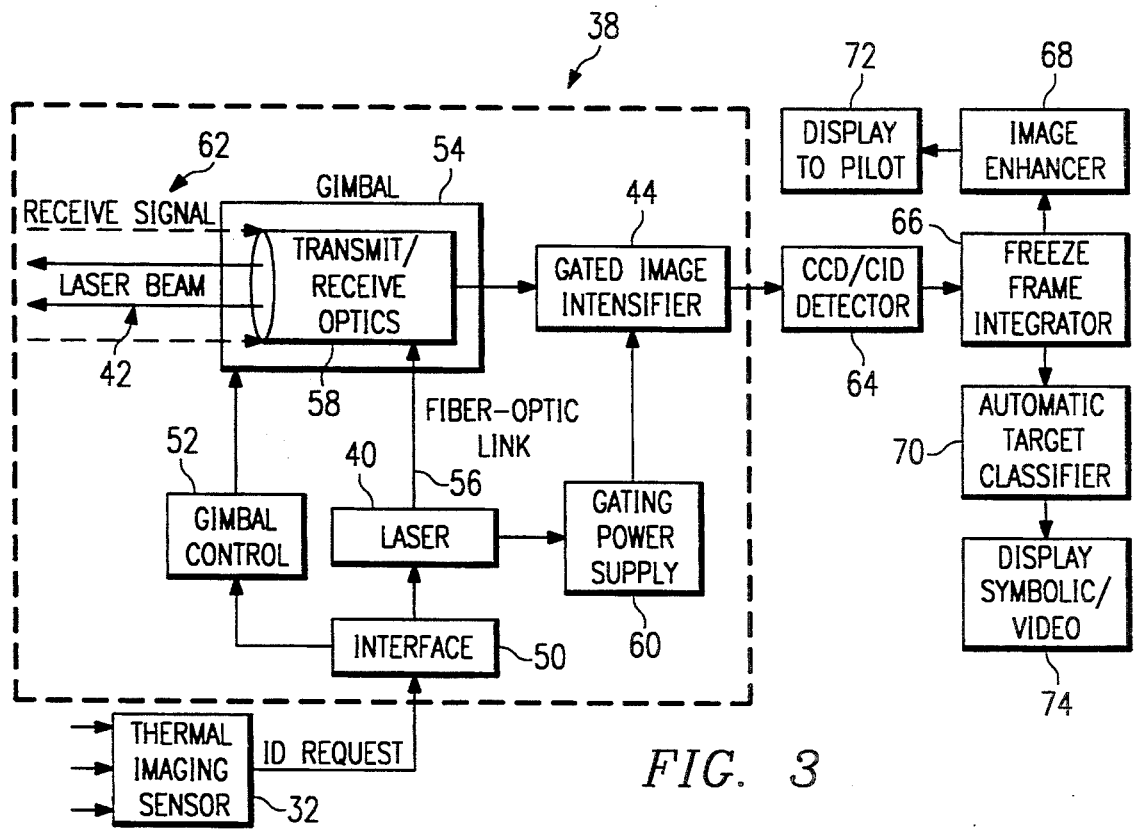
FIG. 3 is a block diagram of the preferred embodiment of the LATARS system of the present invention.

The preferred embodiment of the present invention is illustrated conceptually in FIG. 2 and in block diagram form in FIG. 3. The preferred embodiment may be termed a laser-aided target acquisition and recognition system, or "LATARS," that includes as a key portion of the invention a laser-aided image recognition sensor, or "LAIRS." In FIG. 2, LATARS 30 includes search and detect sensor 32 that detects target 34 within scene 36. Detect sensor 32 may be a TIS or may be a radar system. When detect sensor 32 detects target 34, it passes to LAIRS 38 a set of range parameters such as the target coordinates that identify the angular location of target 34. The coordinates of target 34 are used by LAIRS 38 to queue or orient LAIRS 38 to the angular location of target 34. Once LAIRS 38 is oriented, laser source 40 directs a relatively low-power measurement laser pulse 42 to target 34 to measure the range between LATARS 30 and target 34. This range sets a gating signal for television sensor 44 of LAIRS 38.

Gated television sensor 44 is gated to turn ON only when energy is reflected from target 34. When energy is being sent to target 34, gated television 44 is OFF. This gating function reduces backscatter from the intervening atmosphere that otherwise reduces image quality from gated television sensor 44. Since laser pulse 42 travels at the speed of light, the time to range can be very short. For example, with a range of over 10 nautical miles the gating delay should be approximately 0.123 milliseconds. Once the gating function is set as to desired pulse width and time, an imaging laser pulse can be sent from laser source 40 to target 34.

The laser-aided imaging aspect of LAIRS 38 takes place when laser 40 sends a second and larger imaging laser pulse 43 to target 34. It is imaging laser pulse 43 that illuminates target 34 and produces reflected energy for imaging target 34. Gate television sensor 44 receives reflected energy from target 34 only within the field-of-view that gated television sensor 44 defines. It is not necessary to match the field of view of the laser 40 with that of the gated television 44. The depth of field imaged by gated television 44 is determined by the time interval for which gated television 44 is turned ON. For a depth of field of 100 feet, the gated television 44 is ON for about 200 nanoseconds. It may be desirable to lengthen the time ON by the length of the laser illumination pulse.

Scene 46 illustrates the scene that relates to the small field-of-view 48 of gated television sensor 44. For smaller field-of-view 48, the laser power required for tactically useful ranges reduces to practical levels for air-to-ground applications. Since reduced laser power is necessary for tactically useful ranges, reduced size, reduced weight and reduced cooling requirements apply to the preferred embodiment of the present invention compared to conventional devices that seek to increase recognition ranges. The actual angular coverage for field-of-view 48 may be controlled by queuing and hand off constraints, rather than target sizes. In fact, angular coverages for field-of-view 48 of less than 1° may be practical. As scene 46 indicates, gated television sensor 44 highly magnifies target 34 to permit recognition essentially at or very close to the target 34 detection ranges.

Referring to FIG. 3, there is shown a block diagram to illustrate the functions of LAIRS 38 of LATARS 30 of the preferred embodiment. In FIG. 3, TIS 32 sends an identification request to interface 50 of LAIRS 38. The ID request may be originated by the operator or by means of an automatic target cuing device. The identification request contains the angular coordinates of the expected target relative to the platform. Interface 50 directs a control signal to gimbal control 52 and an energize signal to laser 40 after the gimbal is pointed in the proper direction. Laser 40 sends a laser output along optic link 56 to transmit and receive objects 58, as well as a power signal to gating power supply 60. Transmit/receive optics 58 outputs laser beam 42 to target 34 (FIG. 2). Target 34 returns receive signal 62 from the laser beam 42 as the energy that target 34 reflects. The energy reflected in the form of received signal 62 goes to transmit/receive optics 58 and passes to gated image intensifier 44. Gating power supply 60 controls the operation of gated image intensifier 44. When gated image intensifier 44 is ON, the reflected energy of receive signal 62 is intensified and then passed to CCD/CID detector 64. CCD/CID detector 64 takes the image from gated image intensifier 44 and directs the image to freeze frame integrator 66. Freeze frame integrator stores the image from CCD/CID detector 64 and preserves both amplitude and spacial information relating to target 34. From freeze frame integrator 66, the image may go to one or both of image enhancer 68 or target classifier 70. If the image is sent to image enhancers 68, the image may then be displayed to a pilot within tactical fighter 12, for example. The pilot can then recognize the image himself. On the other hand, if freeze frame integrator 66 sends the image to automatic target recognizer 70, it recognizes target 34 and, through the use of display symbolic/video circuitry 74, displays to the pilot an icon or other symbol to indicate recognition of target 34.

Within the context of the preferred embodiment of FIGS. 2 and 3, a wide variety of variations are possible. For example, instead of using a TIS or radar as detect sensor 32, target range parameters or coordinates may be generated through triangulation or other computation using a digital terrain map. This approach depends on the particular target, but may provide the necessary coordinates to operate LAIRS 38. Another way to provide coordinates or range parameters for use by interface 50 of LAIRS 38 is through a ground positioning system that provides sensor platform coordinates in real time. This information can be immediately useful to derive the necessary coordinates for directing operation of gimbal 54 in the preferred embodiment. Additionally, the light-weight of LATARS 30 may permit the entire system to be placed in one turret of a ground vehicle or aircraft, thus making the preferred embodiment a very attractive addition to or replacement of current detection and recognition sensors on these platforms.

Not only does the present invention have the attractive features of increasing the recognition range of a target, such as target 34, to approximately the target detection range, the configuration of the preferred embodiment has a wide variety of additional desirable functions. For example, within the context of the preferred embodiment, it is possible to perform passive television imaging using CCD/CID detector 64 without output from laser 40 when light levels are sufficiently high. It may also be possible to fuse the image from detector sensor 32 with the image from gated image intensifier 44 and CCD/CID detector 64 to even further improve image intelligence.

An attractive feature that the preferred embodiment provides is obstacle detection and avoidance by illuminating and imaging the terrain in front of a low-flying aircraft. Studies indicate that obstacles in the flight path of low-flying aircraft may not be detected by some sensor systems. The preferred embodiment of the present invention, however, enhances obstacle detection and avoidance for tactical fighter aircraft. Another advantage that the preferred embodiment provides is detection of optical and electro-optical threats through retro-reflection of laser energy as well as blinding, dazzling, or destruction of eyes, optical and electro-optical sensors using radiation from laser 40.

The preferred embodiment makes possible long-range recognition of airborne targets, determination of accurate target coordinates relative to the sensor platform, and independent target tracking by decoupling gated image intensifier 40 and CCD/CID detector 64 from detect sensor 32. This may significantly increase the operational utility of the preferred embodiment in some battlefield scenarios.

Laser 40 is preferably a Nd:YAG laser. This is because a Nd:YAG laser is the type of laser often used for laser-guided missiles. It may, however, be possible to use other lasers such as an Alexandrite laser or a GaAs laser, depending on the tactical scenario contemplated. In essence, any pulsed laser with a wavelength of between 0.7 and 2.0 microns may be used as laser source 40.

Figure 4:
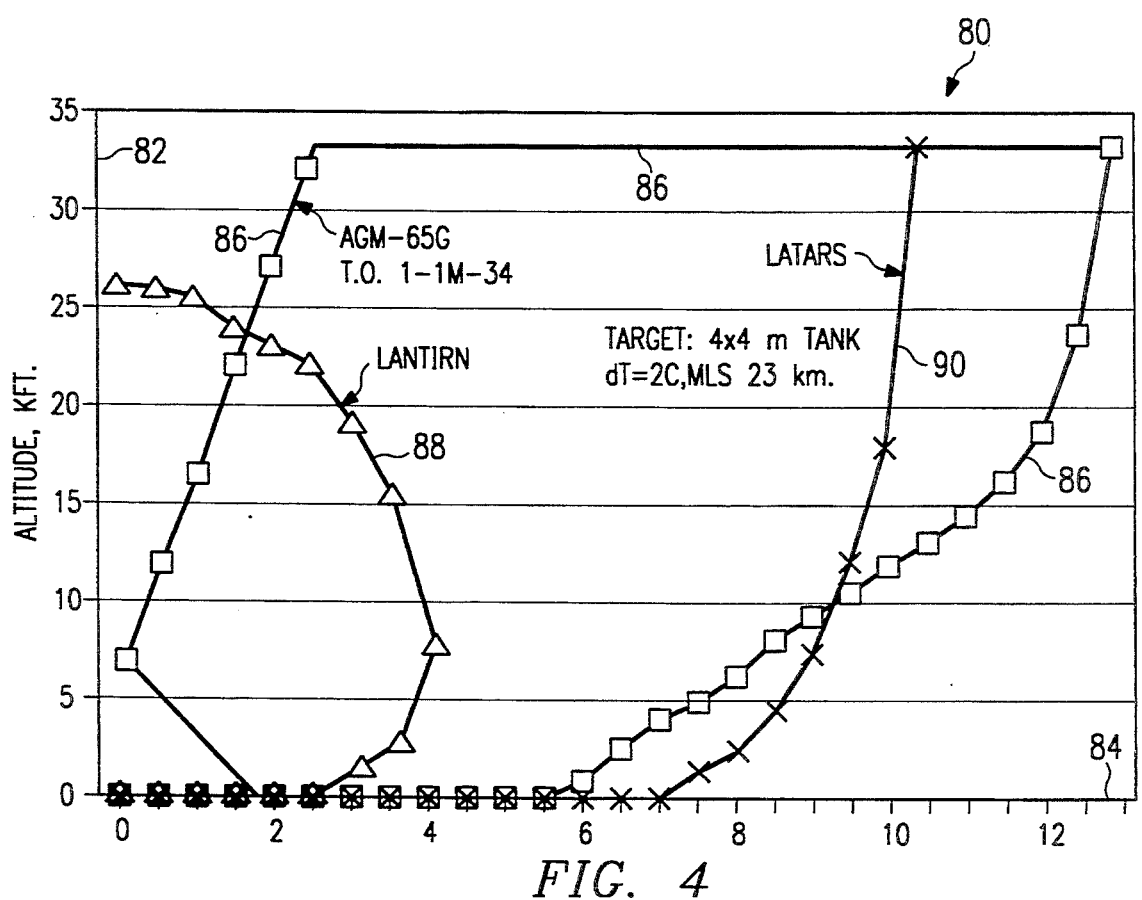
FIG. 4 shows an exemplary missile launch envelope as a function of range to illustrate the improvements of the preferred embodiment.

FIG. 4 illustrates some of the beneficial results that the preferred embodiment of LATARS 30 provides, as shown through a computer-based model. Plot 80 of FIG. 4 plots along ordinate 82 altitude measurements ranging from 0 to 35,000 feet and along abscissa 82 ground range measurements from 0 to approximately 14 kilometers. Curve 86 is a launching envelope for the Maverick Missile as a function of range from the target and altitude of the launch platform. The envelope that curve 86 generates shows the restrictions and the launch envelope within which the pilot/weapons operator must recognize the target prior to launch. FIG. 4 compares the recognition ranges of a conventional system known as LANTIRN to that of LATARS system 30 of the preferred embodiment. On one hand, curve 88 shows the outer limit of recognition of the LANTIRN targeting FLIR system. On the other hand, curve 90 shows the outer limit of recognition for the LATARS system 30 of the preferred embodiment. Clear advantages that plot 80 of FIG. 4 illustrate are improved stand-off ranges, even at greater altitudes. The target for recognition in the computer-generated results of FIG. 4 is a tank that poses to the sensors a 4×4 metersquare object having a dT of 2° C. and a median land speed of 23 kilometers per hour. Viewed through an atmosphere defined by LOWTRAN7 for mid-latitude samer with 23 kilometers visibility.

Figure 5:
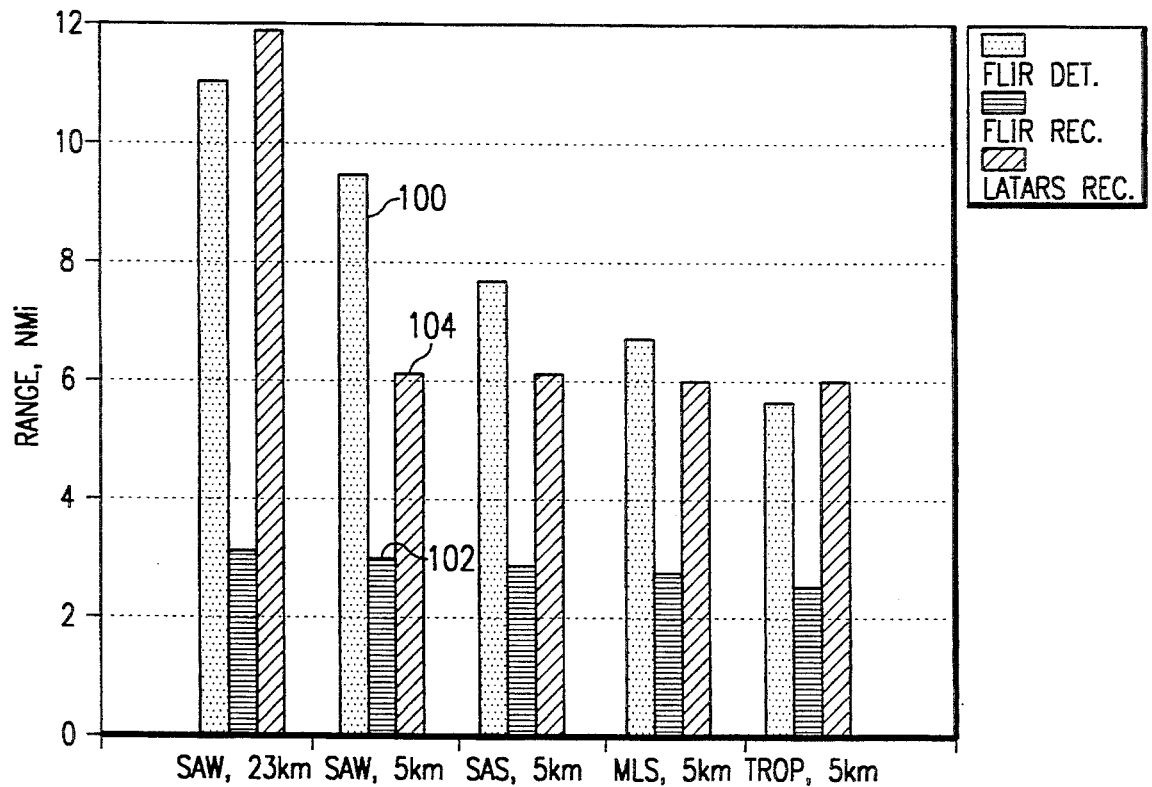
FIGS. 5 and 6 show various detection and recognition range results derived from employing the preferred embodiment of the present invention.
Figure 6:
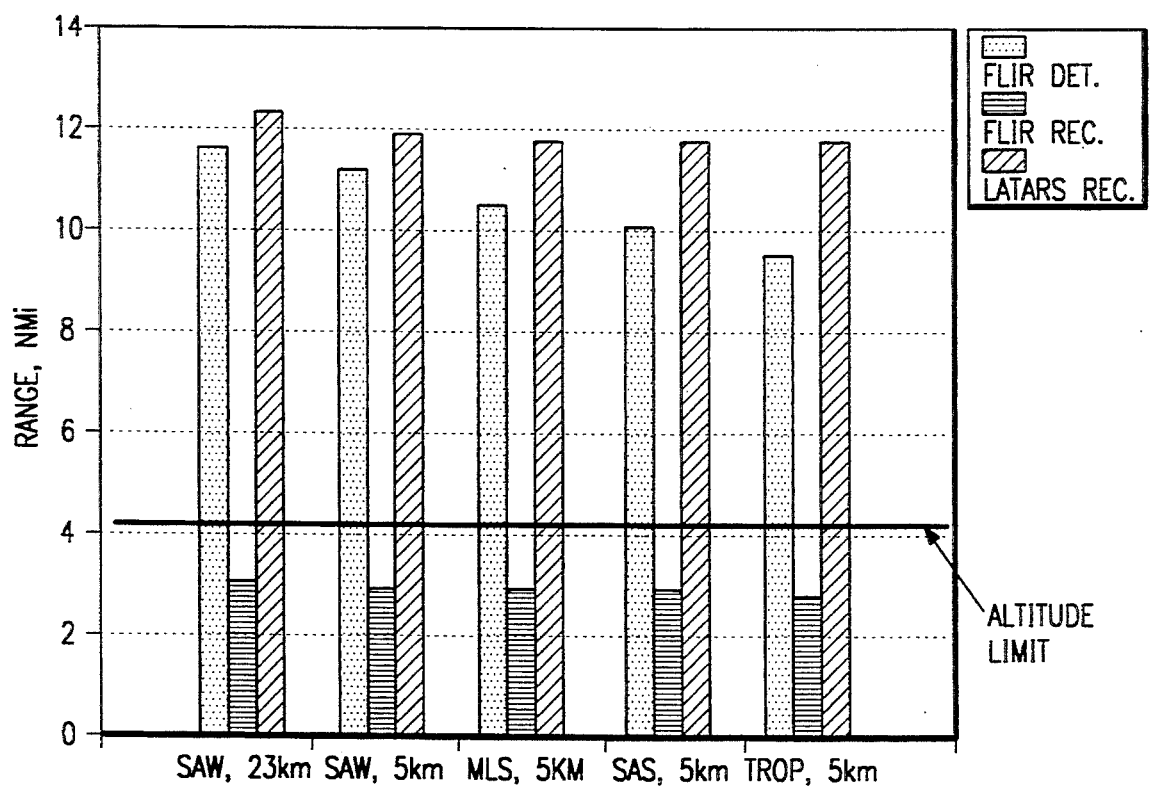

FIGS. 5 and 6 illustrate detection ranges for various sensor systems including the LATARS system 30 of the preferred embodiment. In particular, FIG. 5 shows detection ranges for the sensor being flown at 1,500 feet altitude against various ground targets. In each of FIGS. 5 and 6, a 4×4-meter area target tank with a dT of 2° C. was used. The FLIR detection and recognition ranges were computed with the FLIR 90 model and atmospheric transmission as defined by the LOWTRAN7 model. The LATARS recognition range is computed by a model using the physical parameters of a 4.2 inch aperture, a Generation III image intensifier, and a silicon charge coupled device (CCD). For each scenario, three measurements were calculated. A FLIR detection range is indicated by dot-shaded bars such as the bar of FIG. 5 having reference numeral 100. The FLIR recognition range is indicated by horizontally-shaded bars such as bar 102. The LATARS recognition range is indicated by bars such as bar 104 having the slant shading. The FLIR of the example uses advanced mercury cadmium, telluride focal-plane array detectors with 480×4 elements. The FLIR has a clear aperture of 4.2 inches. The size of LATARS 30 is compatible with applications for military aircraft such as the F-16.

As both FIGS. 5 and 6 illustrate, FLIR recognition ranges are between 2 and 4 times less than the detection ranges depending upon the various weather conditions of the calculations. LATARS 30 recognition ranges are much greater than the FLIR recognition ranges and in some conditions exceed FLIR detection ranges.

In the computer-generated examples, weather degrades from sub-artic winter (SAW) through tropical (TROP) conditions. Note that LATARS recognition range is comparable with FLIR detection ranges, except for one weather condition, i.e., SAW with 5-kilometer visibility. Even at this condition, LATARS recognition range is about two times that of the FLIR. The weather conditions were modeled by LOWTRAN7. The various conditions are SAW with 23-kilometer visibility; SAW with 5-kilometer visibility; sub-artic summer (SAS) with 5-kilometer visibility; mid-latitude summer (MLS) with 5-kilometer visibility; and tropical (TROP) with 5-kilometer visibility. The drawing of FIG. 6 is similar to that of FIG. 5, except that it is necessary for the sensor platform to be at a 25,000-feet altitude.

In summary, there is provided a method and system for recognizing a target at a range comparable to the range at which the target is initially detected and that includes the steps of detecting a target relative to a sensor platform and, then, determining a set of range parameters such as target coordinates from the sensor platform to the target. The next step is transfer the set of range parameters to an imaging device associated with the sensor platform. The imaging device includes a laser source and a gated television sensor. The imaging device then illuminates the target according to the range parameters with an imaging laser pulse from the laser source to generate reflected energy from the target. The next step is to image a highly-magnified portion of the reflected energy using the gated television sensor to generate a plurality of target images. Then, the preferred embodiment recognizes the plurality of target images as the target using either an automatic target recognizer or by presenting the plurality of target images on a display for further recognition.

Although the present invention and its advantages have been described in detail, it should be understood that various changes, substitutions, and alterations can be made herein without departing from the spirit and scope of the invention as defined by the appended claims.

What is claimed is:

1. An improved method for recognizing a target, comprising the steps of:
   (a) detecting a target relative to a sensor platform;
   (b) determining a set of range and angle parameters from said sensor platform to the target;
   (c) transferring said set of range and angle parameters to an imaging recognition sensor associated with said sensor platform, said imaging recognition sensor comprising a laser source and a gated television sensor;
   (d) illuminating the target according to said set of range and angle parameters with an imaging laser pulse from said laser source, the target reflects at least some of the energy of the imaging laser pulse generating reflected energy from the target;
   (e) collecting and highly magnifying a portion of said reflected energy;
   (f) imaging said highly-magnified portion using said gated television sensor to generate a plurality of target images; and
   (g) recognizing the target from at least one of said plurality of target images as the target.

2. The method of claim 1, wherein said detecting step comprises the step of detecting a thermal image of the target.

3. The method of claim 1, wherein said detecting step comprises the step of detecting a radar signal return from the target.

4. The method of claim 1, wherein said detecting step further comprises the step of generating a set of coordinates relating to the target, and wherein said determining step further comprises the step of illuminating with a measurement laser pulse an area associated with said set of coordinates.

5. The method of claim 1, wherein said imaging step further comprises the step of gating said gated television sensor as a function of said set of range and angle parameters to reduce backscatter from said imaging laser pulse prior to said illuminating the target step.

6. The method of claim 1, wherein said determining step further comprises the step of directing to the target a measurement laser pulse having a lower pulse energy than said imaging laser pulse.

7. The method of claim 6, wherein said determining step further comprises the step of directing said measurement laser pulse as a pulse having an energy equivalent to said imaging laser pulse.

8. The method of claim 1, wherein said recognizing step further comprises the step of recognizing the target using an automatic target classifier.

9. The method of claim 1, further comprising the step of enhancing for display said plurality of target images.

10. An improved method for recognizing a target, comprising the steps of:
    detecting a target relative to a sensor platform;
    generating a set of range and angle parameters from said sensor platform to the target in response to said detecting step;

passing said set of range and angle parameters to an imaging recognition sensor, said imaging recognition sensor comprising a laser-aided imaging recognition sensor (LAIRS) system, said LAIRS system comprising a laser source for generating an imaging laser pulse and a gated television sensor, said gated television sensor operating at the same wavelength as said imaging laser;

illuminating the target according to said range and angle parameters with the imaging laser pulse from said laser source, the target reflects at least some of the energy of the imaging laser pulse generating reflected energy from the target;

collecting and highly magnifying a portion of said reflected energy;

imaging said highly-magnified portion using said gated television sensor to generate a plurality of target images; and recognizing the target from at least one of said plurality of target images.

11. The method of claim 10, further comprising the step of aiming said LAIRS system at the target as a function of said set of coordinates.

12. The method of claim 10, wherein said illuminating step further comprises illuminating the target according to said set of coordinates with an imaging laser pulse with a beam width larger than the target.

13. The method of claim 10, wherein said imaging step further comprises imaging said highly-magnified portion using said gated television to minimize backscatter from intervening atmosphere between the target and said sensor platform and to remove range diverse backgrounds at other than the coordinates of the target.

14. The method of claim 10, wherein said generating step further comprises the step of directing to the target a measurement laser pulse have a lower pulse energy than said imaging laser pulse.

15. A method for increasing the recognition range of a target, comprising the steps of:

detecting a target relative to a sensor platform;

generating angle coordinates associated with the target;

providing said angle coordinates to a laser-aided imaging recognition sensor (LAIRS) system, said LAIRS system comprising a laser illuminator and an imaging device operating at the same wavelengths as said laser illuminator;

aiming said LAIRS system in accordance with said angle coordinates;

illuminating the target with a measurement laser pulse for measuring a range from said LAIRS system to the target and determining from said range a set of gating parameters associated with said imaging device;

illuminating the target with an imaging laser pulse, the target reflects at least a portion of the energy of the imaging laser pulse generating reflected energy from said target;

gating said imaging device in accordance with said gating parameters to receive said energy reflected from the target;

collecting and highly magnifying a portion of said reflected energy;

imaging said energy reflected from the target on the imaging device to form an image of the target; and recognizing said image of the target.

16. The method of claim 15, wherein said detecting step comprises the step of detecting a radar return from the target.

17. The method of claim 15, wherein said detecting step comprises the step of detecting infrared emissions from the target.

18. The method of claim 15, further comprising the step of enhancing said image of the target for display.

19. The method of claim 15, further comprising the step of recognizing said image of the target using an automatic target recognizer.

* * * * *